United States Patent
Mann et al.

(10) Patent No.: US 7,848,941 B2
(45) Date of Patent: Dec. 7, 2010

(54) BUSINESS ANALYSIS AND MANAGEMENT SYSTEMS UTILIZING ENTERPRISE METRICS

(75) Inventors: Michael M. Mann, Palos Verdes Estates, CA (US); Arne Haugland, Pleasanton, CA (US)

(73) Assignee: EnCompass Knowledge Systems, Inc., Culver City, CA (US)

( * ) Notice: Subject to any disclaimer, the term of this patent is extended or adjusted under 35 U.S.C. 154(b) by 1864 days.

(21) Appl. No.: 10/679,255

(22) Filed: Oct. 3, 2003

(65) Prior Publication Data

US 2005/0159965 A1 Jul. 21, 2005

Related U.S. Application Data

(60) Provisional application No. 60/417,098, filed on Oct. 8, 2002, provisional application No. 60/417,018, filed on Oct. 8, 2002.

(51) Int. Cl.
*G06F 9/44* (2006.01)
*G06F 17/50* (2006.01)

(52) U.S. Cl. .......................................................... 705/7
(58) Field of Classification Search ........................ None
See application file for complete search history.

(56) References Cited

U.S. PATENT DOCUMENTS

| | | | |
|---|---|---|---|
| 5,499,357 A | | 3/1996 | Sonty et al. |
| 5,671,360 A | * | 9/1997 | Hambrick et al. ............. 705/9 |
| 5,835,085 A | * | 11/1998 | Eick et al. .................. 715/853 |
| 6,026,382 A | | 2/2000 | Kalthoff |
| 6,067,548 A | * | 5/2000 | Cheng .................... 707/103 R |
| 6,119,097 A | | 9/2000 | Ibarra |
| 6,182,136 B1 | | 1/2001 | Ramanathan et al. |
| 6,222,535 B1 | * | 4/2001 | Hurd, II ...................... 715/733 |
| 6,311,175 B1 | | 10/2001 | Adriaans et al. |
| 6,370,575 B1 | * | 4/2002 | Dougherty et al. .......... 709/224 |
| 6,397,202 B1 | | 5/2002 | Higgins et al. |
| 6,411,936 B1 | | 6/2002 | Sanders |
| 6,442,557 B1 | | 8/2002 | Buteau et al. |
| 6,631,473 B2 | * | 10/2003 | Townsend .................... 726/25 |
| 6,675,127 B2 | * | 1/2004 | LaBlanc et al. ............. 702/181 |
| 6,675,149 B1 | | 1/2004 | Ruffin et al. |

(Continued)

OTHER PUBLICATIONS

EnCompass Knowledge Systems, Inc. http://web.archive.org/web/*/http://www.encompassknowledge.com/.*

(Continued)

*Primary Examiner*—Romain Jeanty
*Assistant Examiner*—Brandi P Parker
(74) *Attorney, Agent, or Firm*—Howard N. Sommers

(57) ABSTRACT

A system utilizing enterprise metrics measurement groups, including but not limited to:
1) CLARITY (or "alignment") is the overall level of agreement and understanding among the members of the organization or organizational unit;
2) INVOLVEMENT is a measure of how effectively the organization's members are engaged in carrying out the tasks that are viewed as important to it;
3) LEVERAGE is the degree to which the existence of an organization provides its members with greater influence than they would have a independent individuals;
4) PRIORITY is a measure of the perceived impact of all the issues examined in an EnCompass study;
5) RELATIVE PRIORITY is a measure of the perceived impact of a selected issue, as compared with that of the other issues under consideration; and
6) INTEGRATION measures the degree of interconnection between two organizations or organizational units, by examining the links between them.

12 Claims, 9 Drawing Sheets

U.S. PATENT DOCUMENTS

| | | | |
|---|---|---|---|
| 2001/0008997 | A1 | 7/2001 | Masuda et al. |
| 2002/0116466 | A1* | 8/2002 | Trevithick et al. ........... 709/206 |
| 2002/0147710 | A1* | 10/2002 | Hu ................................. 707/3 |
| 2002/0178035 | A1 | 11/2002 | Lajouanie |
| 2002/0184067 | A1* | 12/2002 | McLean et al. ................ 705/7 |
| 2003/0083923 | A1 | 5/2003 | Guicciardi et al. |
| 2003/0110070 | A1 | 6/2003 | De Goeij |
| 2003/0120539 | A1* | 6/2003 | Kourim et al. ................ 705/11 |
| 2003/0233249 | A1 | 12/2003 | Walsh et al. |
| 2005/0114201 | A1 | 5/2005 | Walsh et al. |

OTHER PUBLICATIONS

"Digital Concepts Streamlines Operations Using Savvion BusinessManager", PR Newswire, Sep. 12, 2000 [retrieved May 12, 2006], pp. 1-4, retrieved from: Dialog, file 20.

"Savvion Opens European Headquarters to Drive Market Acceptance", PR Newswire, Oct. 6, 2000 [retrieved May 12, 2006], pp. 1-4, retrieved from: Dialog, file 613.

"Savvion Begins Formal Operations in Japan", PR Newswire, Jul. 27, 2000 [retrieved May 12, 2006, pp. 1-4, retrieved from: Dialog, file 613.

Savvion, Inc., www.savvion.com, Apr. 25, 2001 [retrieved May 11, 2006], pp. 1-16, retrieved from: Google.com and archive.org.

EnCompass Knowledge Systems, Inc., "Knowledge Management", www.encompassknowledge.com, pp. 1-9, retrieved from Google.com.

"Declaration of Michael M. Mann in Support of Amendment in Response to Office Action", dated Apr. 18, 2008; Filed in U.S. Appl. No. 10/959,640, filed Oct. 7, 2004 entitled Business Analysis and Management Systems Utilizing Emergent Structures, in response to Office Action dated Oct. 19, 2007; 2 pages.

* cited by examiner

FIG. 1

| ID △ | Project | Type | Label | Description |
|---|---|---|---|---|
| IS0000001 | Sample DB | Issue 01 | Product Creation | Product Development and Creation |
| IS0000002 | Sample DB | Issue 02 | Mkt.Plng/Positioning | Market planning and positioning |
| IS0000003 | Sample DB | Issue 03 | Cap.Plng and Util. | Capital planning and utilization |
| IS0000004 | Sample DB | Issue 04 | Order Fulfillment | Order Fulfillment |
| IS0000005 | Sample DB | Issue 05 | Customer Comm. | Customer Communication |
| IS0000006 | Sample DB | Issue 06 | Mgmt. Processes | Management Processes |
| IS0000007 | Sample DB | Issue 07 | Fiscal Management | Fiscal Management |

FIG. 2

Name: John Frees     ID# 103

| | With whom do you interact at least monthly in ways that are generally important in order to get your tasks done, or to help the other person get his/her tasks done? | About how often do you interact with the person in order to do your tasks or for them to do theirs? | About how important is this interact with the person in your tasks, or for them to do theirs? | When you interact with this person, how often do your interactions have significant impact on making decisions—either your decisions or theirs about the following business process? (Use the database on the attached sheet.) |||||||
|---|---|---|---|---|---|---|---|---|---|---|
| | | *FREQUENCY* | *IMPORTANCE* | Impact Scale Range is 1 through 5 (//never, leave blank) Seldom  Occasionally  Half the time  Usually  Always |||||||
| | | Frequency Range | Importance Range | | 1 | 2 | 3 | 4 | 5 | |
| | | 5-Several times a day  4-Several times a week  3-Several times a month  2-About once a month | 5-Critical  4-Very important  3-Important  2-Minimal importance | Product Creation | Mkt.Plng/ Positioning | Capital Plng/ Utilization | Order Fulfillment | Cust. Comm. | Mgmt. Proc. | Fiscal Mgmt. |
| D. Scale | | 4 | 4 | 4 | 5 | 0 | 3 | 5 | 4 | 4 |
| D. Vogel | | 3 | 3 | 2 | 3 | 4 | 2 | 2 | 2 | 2 |
| P. Kilroy | | 3 | 4 | 0 | 0 | 1 | 0 | 0 | 2 | 2 |
| R. Baird | | 2 | 3 | 2 | 2 | 0 | 0 | 2 | 0 | 0 |
| N. Dooley | | 2 | 4 | 1 | 1 | 3 | 1 | 1 | 2 | 1 |
| J. Swordlow | | 3 | 3 | 0 | 2 | 1 | 3 | 1 | 2 | 2 |
| P. Packard | | 3 | 3 | 3 | 3 | 0 | 1 | 1 | 2 | 2 |
| C. Brim | | | | | | | | | | |

FIG. 3

| General | Issues 1-10 | Issues 11-20 |

Id: D10000128
Project: Sample DB ▶
Type: As Is ▶
Subtype: ▶
Label:
Survey Date: ☒ 10/22/2001 ▶

Person Interaction
Frequency: 4  Importance: 4

Interaction
From Person: John Frees
To Person: Dick Scales

FIG. 4

| General | Issues 1-10 | Issues 11-20 |

From: John Frees  To: Dick Scales

Product Creation
Impact: 4  Frequency: 0  Hours per week: 0.00

Mkt.Plng/Positioning
Impact: 5  Frequency: 0  Hours per week: 0.00

Cap.Plng and Utili.
Impact: 0  Frequency: 0  Hours per week: 0.00

Order Fulfillment
Impact: 3  Frequency: 0  Hours per week: 0.00

Customer Comm.
Impact: 5  Frequency: 0  Hours per week: 0.00

Mgmt.Processes
Impact: 4  Frequency: 0  Hours per week: 0.00

Fiscal Management
Impact: 4  Frequency: 0  Hours per week: 0.00

FIG. 6

Model One
- ☑ Show
- Interaction
  - Agreement Status: Either
  - Criteria: Management Process +/-1, the rest is 5
- Data Collection: Mgmt Process >=4 Freq/Impact >=4 ○ Or  Data Collection:
  - Order Fulf. >=3 (Freq. & Impt. >=4)
  - Mgmt Process >=4 Freq/Impact >=4
- From
  - Person: ○ Or  To
  - Person: Corporate
- Organization: ○ Or  Organization:

FIG. 10

Show Results
- Eliminate: Eliminate
  - Eliminate
  - Keep
  - No Elimination
- Agreement Status: Agreed
- Criteria: Management Process +/-1, the rest is 5

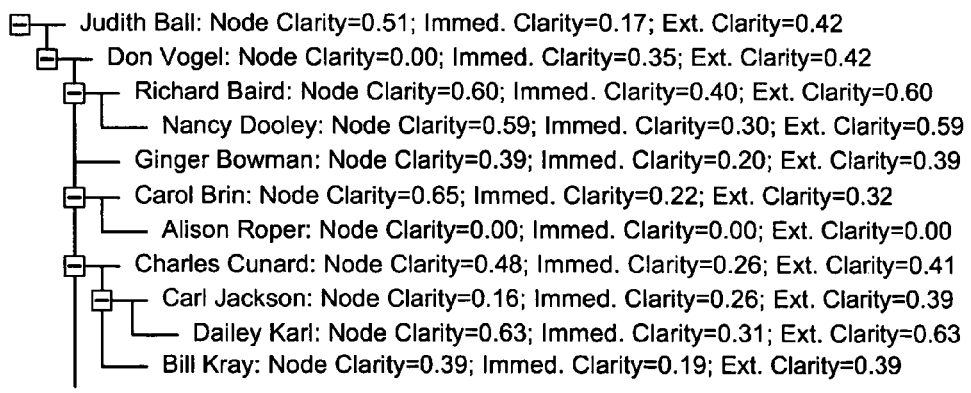

Judith Ball: Node Clarity=0.51; Immed. Clarity=0.17; Ext. Clarity=0.42
　Don Vogel: Node Clarity=0.00; Immed. Clarity=0.35; Ext. Clarity=0.42
　　Richard Baird: Node Clarity=0.60; Immed. Clarity=0.40; Ext. Clarity=0.60
　　　Nancy Dooley: Node Clarity=0.59; Immed. Clarity=0.30; Ext. Clarity=0.59
　　Ginger Bowman: Node Clarity=0.39; Immed. Clarity=0.20; Ext. Clarity=0.39
　　Carol Brin: Node Clarity=0.65; Immed. Clarity=0.22; Ext. Clarity=0.32
　　　Alison Roper: Node Clarity=0.00; Immed. Clarity=0.00; Ext. Clarity=0.00
　　Charles Cunard: Node Clarity=0.48; Immed. Clarity=0.26; Ext. Clarity=0.41
　　　Carl Jackson: Node Clarity=0.16; Immed. Clarity=0.26; Ext. Clarity=0.39
　　　　Dailey Karl: Node Clarity=0.63; Immed. Clarity=0.31; Ext. Clarity=0.63
　　　Bill Kray: Node Clarity=0.39; Immed. Clarity=0.19; Ext. Clarity=0.39

FIG. 13

BUSINESS ANALYSIS AND MANAGEMENT SYSTEMS UTILIZING ENTERPRISE METRICS

CROSS-REFERENCE TO RELATED APPLICATION

This application is claiming the benefit of a provisional application Ser. No. 60/417,098 filed on Oct. 8, 2002. The material of the related provisional application is incorporated by reference herein. This application is being concurrently filed with a related utility application entitled BUSINESS ANALYSIS AND MANAGEMENT SYSTEMS UTILIZING EMERGENT STRUCTURES from provisional application Ser. No. 60/417,018 filed Oct. 8, 2002.

A Compact Disc-Recordable (CD-R) which includes a computer program listing is submitted with this application, since the computer program listing has over 300 lines of code. The material on the CD-R is also incorporated by reference herein.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates generally to enhanced business analysis, evaluation and management systems and, more particularly, to improvements in such systems where increased accuracy, efficiency and effectiveness is achieved in the analysis of complex interactive system/organizational relationships and environments through the use of enterprise metrics generated via the practice of the invention.

2. Description of Related Art

There has been a long existing need in the business world for various methods and means for enhancing organizational processes and dealing with relevant organizational issues to achieve effective management in ever changing, complex, interactive systems and environments. Unfortunately, efforts to date in attempting to efficiently and effectively deal with relevant issues and relationships in such organizations have met with little success. Accordingly, the present invention obviates the disadvantages of such prior efforts and achieves unprecedented success where other approaches have heretofore failed.

SUMMARY OF THE INVENTION

Briefly, and in general terms, the enterprise metrics analysis system and business method of the present invention includes a computer-supported tool for improved enterprise process analysis and change management. The new and improved system and method of the present invention is practiced in a system which collects data on the patterns of interaction among people in an organization, analyzes these relationships with respect to specific organizational processes and issues, and presents the results in a graphical format useful for business management decisions.

More particularly, by way of example and not necessarily by way of limitation, the enterprise metrics of the present invention includes a set of tools available to a consultant in the data analysis stage of the process, through the EnCompass® software. "EnCompass®" is a registered trademark of EnCompass Knowledge Systems, Inc., Los Angeles, Calif., the company which has pioneered innovative tools for analysis of interactive relationships and dynamics. Using a novel combination of statistical methods, enterprise metrics measure the amount of agreement among the organization's members with regard to the importance and impact of all their individual interactions with one another.

Taken singly, each of these metrics tools or indicators provides a means for quantifying an organizational characteristic such as "integration" or "clarity", which, in other analytical settings, is typically described in less precise and more impressionistic terms. Collectively, they amount to an overall "scorecard" of the degree to which an organization's communications and decision-making processes are integrated and effective. Once established, these figures can serve as benchmarks for orienting and monitoring organizational change and improvement, in accordance with the present invention.

Each of the individual enterprise metrics is based on a statistical equation that is automatically applied to a group of records, selected from an existing database according to criteria previously defined in the EnCompass® software. The context within which each of the results is displayed is likewise part of the EnCompass® system. The enterprise metrics, applied as the business method of the present invention, involves the statistical measurements themselves, as they are applied to the study of organizational dynamics, and the procedures by which the software selects appropriate database records and determines the resulting values for each of the metrics.

Enterprise metrics currently comprise six measurement groups, but may include others without departing from the scope of the invention. These groups may include the following:

1) CLARITY (or "alignment") is the overall level of agreement and understanding among the members of the organization or organizational unit;
2) INVOLVEMENT is a measure of how effectively the organization's members are engaged in carrying out the tasks that are viewed as important to it;
3) LEVERAGE is the degree to which the existence of an organization provides its members with greater influence than they would have a independent individuals;
4) PRIORITY is a measure of the perceived impact of all the issues examined in an EnCompass study;
5) RELATIVE PRIORITY is a measure of the perceived impact of a selected issue, as compared with that of the other issues under consideration; and
6) INTEGRATION measures the degree of interconnection between two organizations or organizational units, by examining the links between them.

The enterprise metrics evaluate links between nodes on a tree structure provided by the EnCompass® software. Therefore, the numbers they return depend on how many nodes are included in the calculation, and which ones. The program calculates the figures for every node (including the root) on the basis of a particular tree structure, whose depth and direction can be altered in two different ways. Noninteractively—that is, outside the user's control—the program can present metrics families which define various groups of nodes. Under the user's control within the user interface, the depth and direction of the tree display itself can limit the number of nodes to be included in the tree, and hence the calculation.

The most general use of the EnCompass® enterprise metrics is to examine the performance of an organization as a whole. For this, the analyst simply displays a tree with the highest-level entity as its root, and reads the figures attached to that node. However, metrics are in fact calculated and displayed for every node in the tree—that is, every person who is represented in a given analysis. When an analyst wishes to focus attention on a specific part of an organization, he or she can read the figures for any individual node.

It is possible to define families of metrics, which specify the group of nodes upon which the calculations will be based. Currently, there are two such families for all metrics. The immediate family includes only the node and its direct child nodes. The extended family includes a node and all those beneath it on the tree. Therefore, immediate metrics are based on a person's interactions with only those who report to him or her directly, whereas extended metrics produce figures reflecting his or her relationships with all subordinates at any level.

For the Clarity metric, there is an additional type; node clarity calculates the numbers of confirmed vs. unconfirmed links from the point of view a single node. In other words, the node's family includes only itself.

Other metrics families are also possible: for example, influence metrics count those persons anywhere in the organization who are within a person's sphere of influence, that is, those with whom the person has direct interaction links. Organization metrics measure any person's clarity, involvement, or other parameter with respect to the organization as a whole.

The user interface permits the analyst to limit the tree display to a desired number of levels. If the selected depth is less than that of the organization structure, the metrics calculations will change accordingly.

For any node, the direction of the tree also strongly affects the calculations for all nodes. It is possible to construct a tree upward though the data structure, so that the values for any individual node are calculated with respect to those above him or her in the organizational hierarchy, either direct superiors (in the case of the immediate metrics family) or all the way to the top of the organization structure (for extended metrics).

All of the above and other features of the invention are facilitated by appropriate software for providing/enabling the functions in the illustrated and equivalent embodiments to "make it happen" in achieving new and improved business analysis and management systems utilizing enterprise metrics.

These and other objects and advantages of the invention will become apparent from the following more detailed description, when taken in conjunction with the accompanying drawings of illustrative embodiments.

BRIEF DESCRIPTION OF THE DRAWINGS

FIG. 1 is a table of project issues used in the practice of the present invention;

FIG. 2 is a data collection instrument in tabular form;

FIG. 3 illustrates a data collection record for general data;

FIG. 4 illustrates a data collection record for issue-specific data;

FIG. 6 illustrates a model 1 query selection;

FIG. 10 illustrates a show results panel;

FIG. 13 illustrates a display of metrics results.

DETAILED DESCRIPTION OF THE PREFERRED EMBODIMENTS

Figure 5:
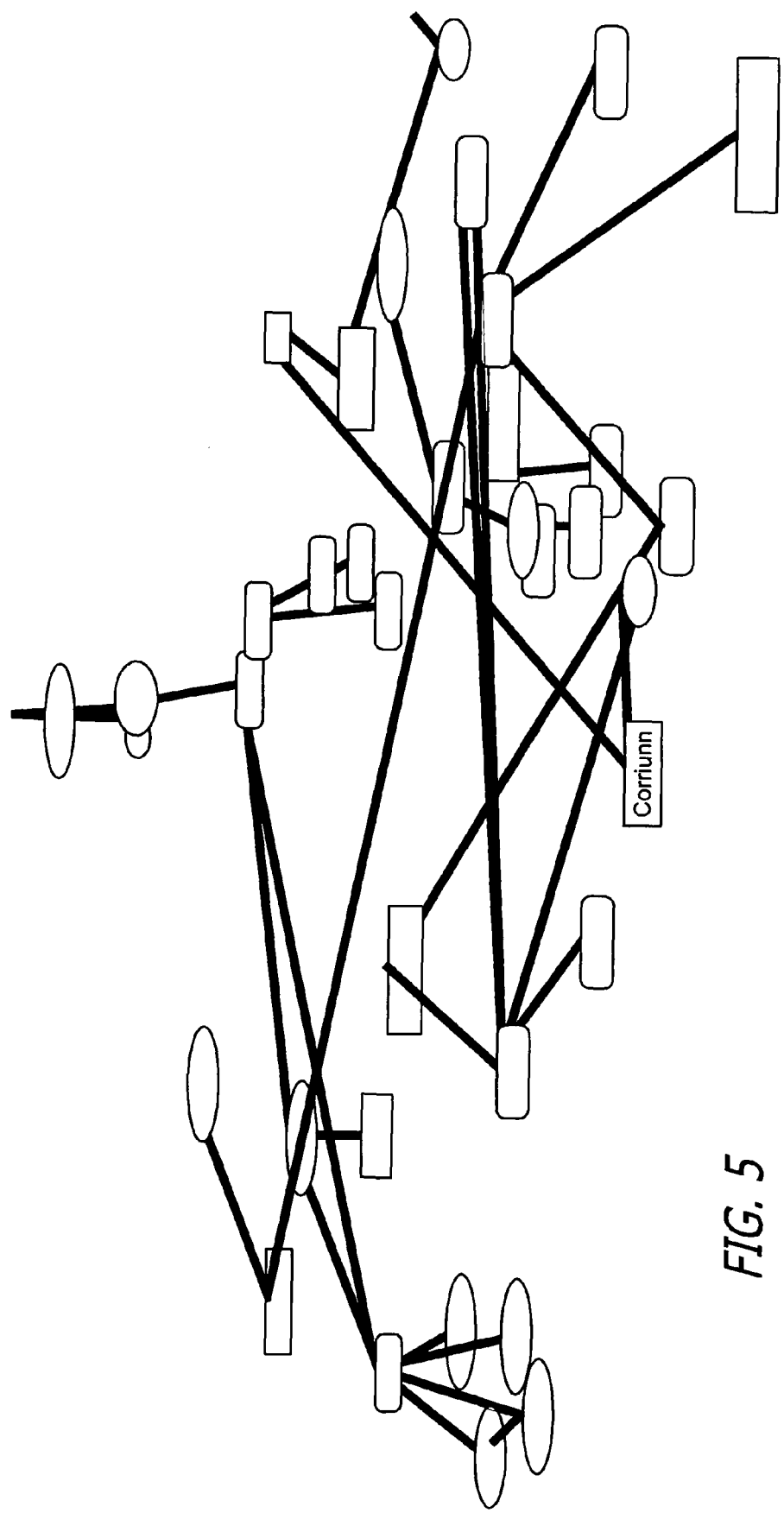
FIG. 5 is an example analysis display.
Figure 7:
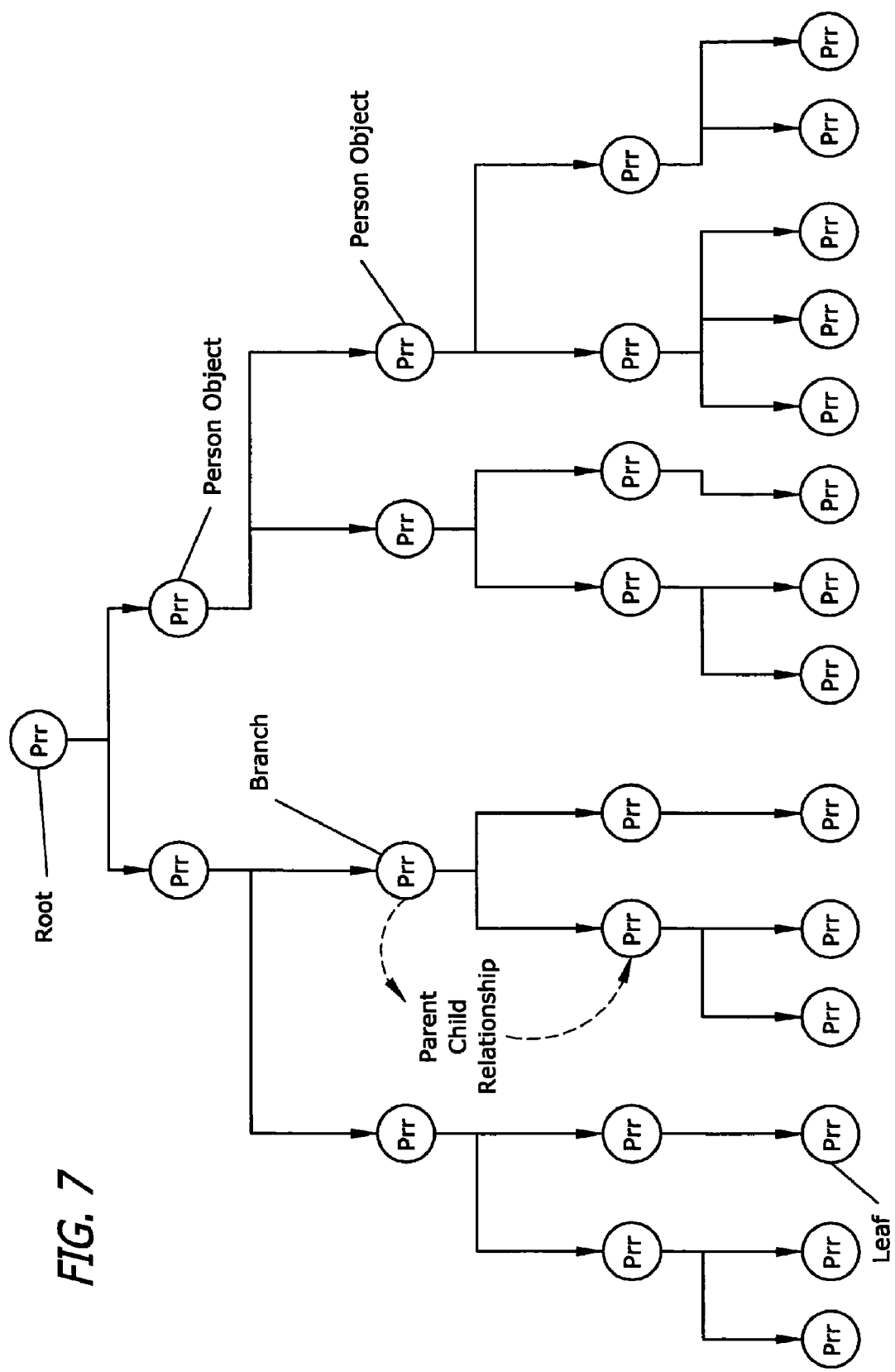
FIG. 7 illustrates a basic tree structure used in practicing the invention.
Figure 8:
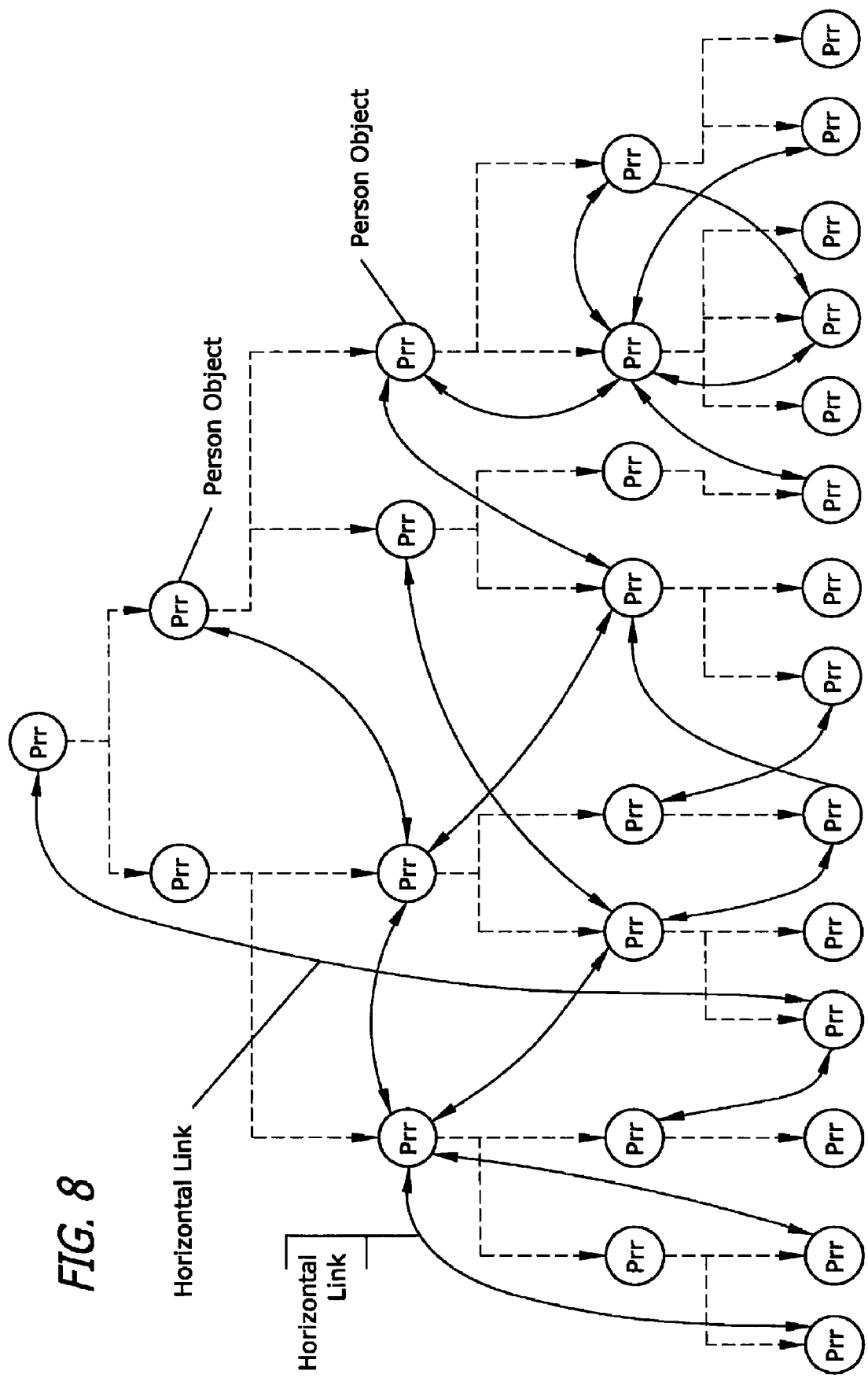
FIG. 8 illustrates the superimposing of horizontal links.
Figure 9:
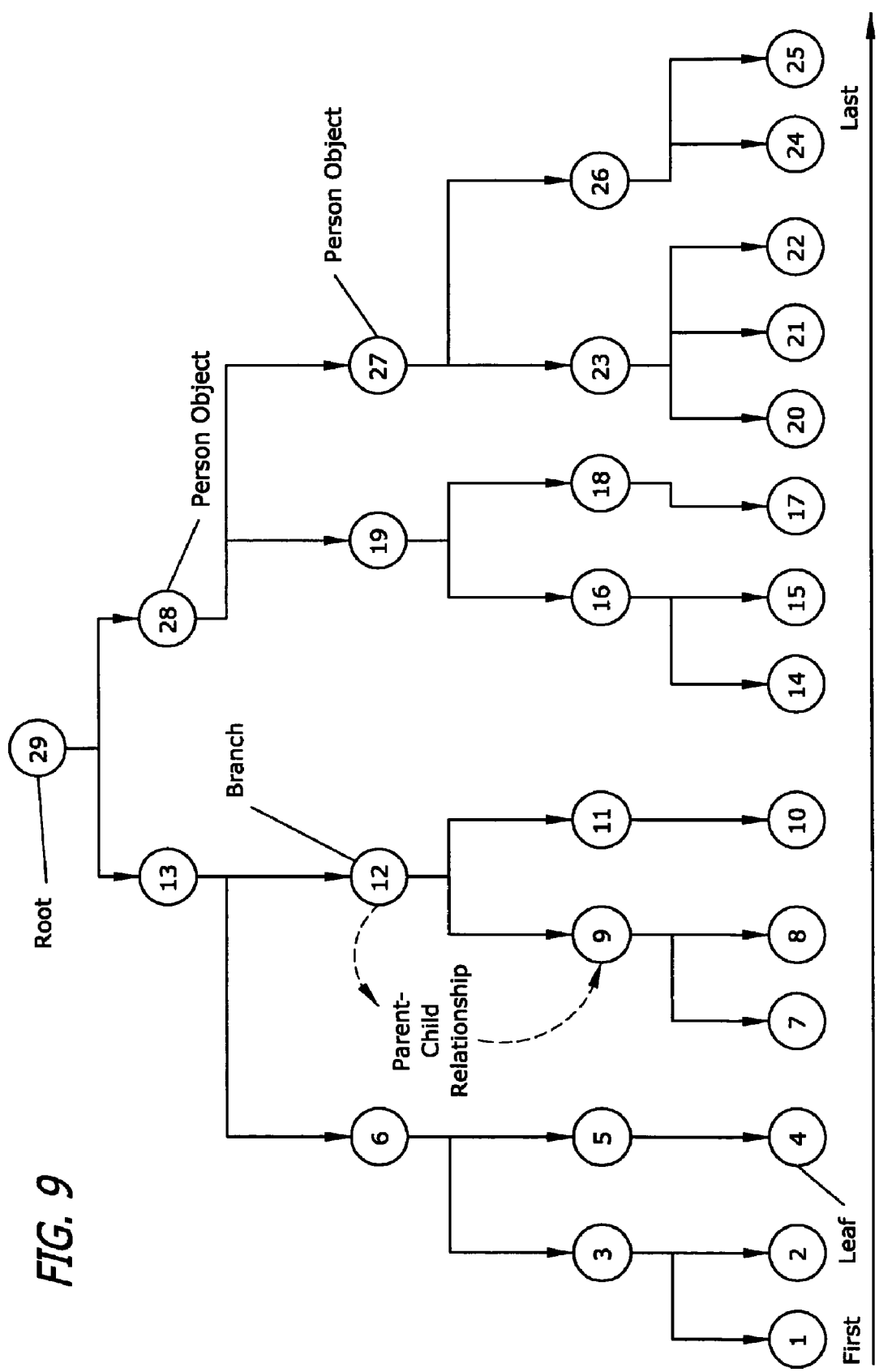
FIG. 9 illustrates traversing a tree in "IN" order.
Figure 11:
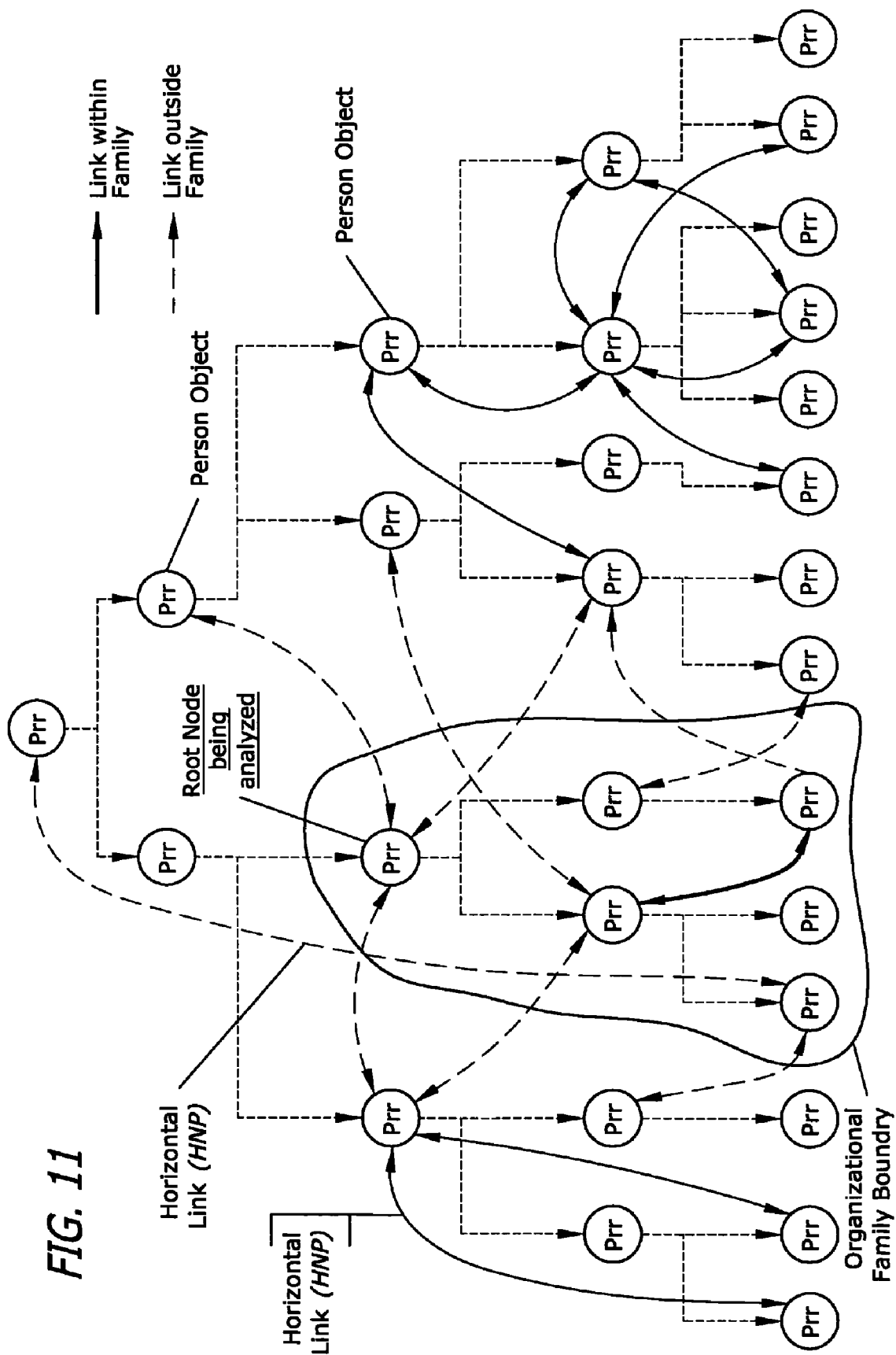
FIG. 11 illustrates an extended node family.
Figure 12:
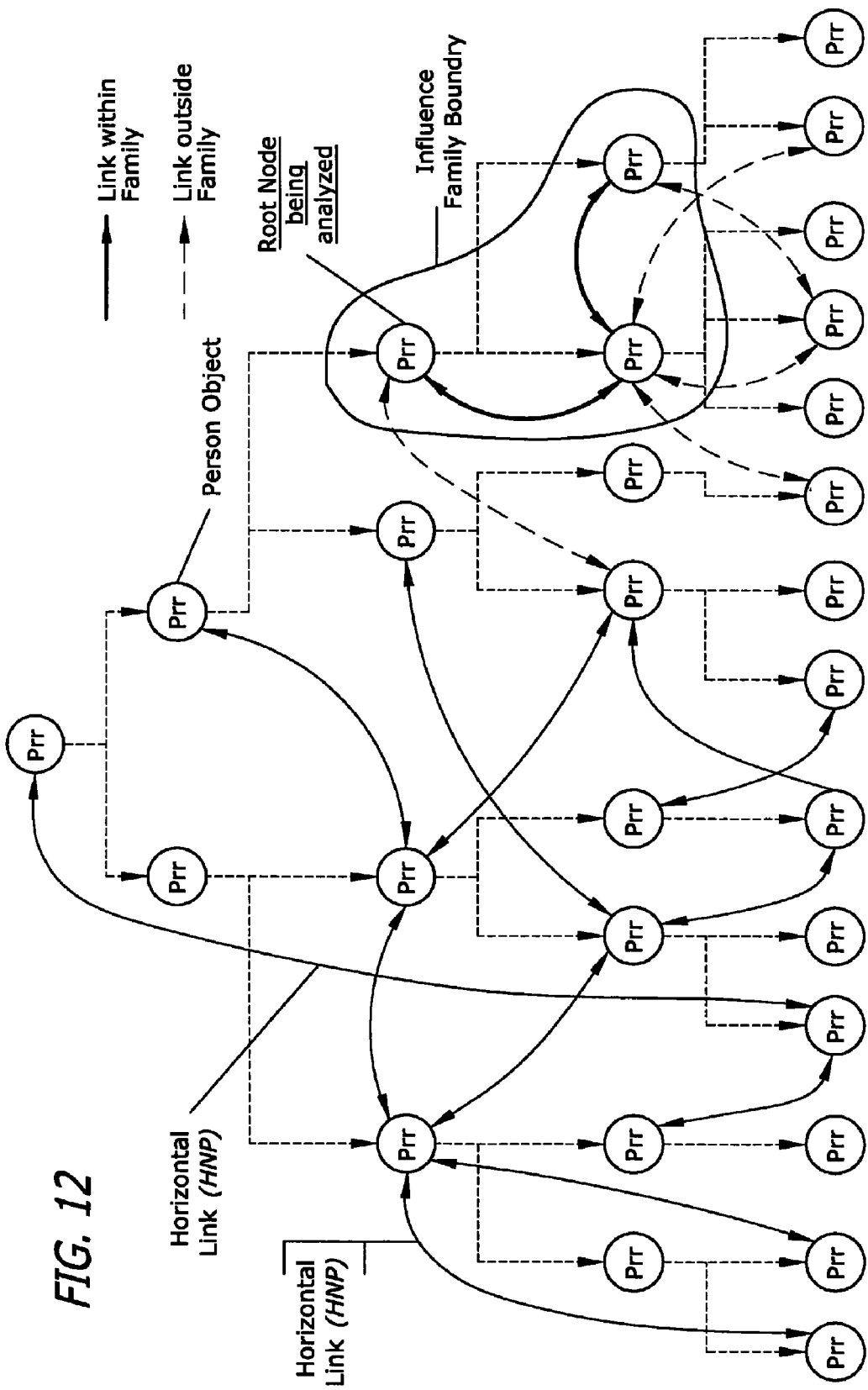
FIG. 12 illustrates an immediate node family.

Briefly, and in general terms, the enterprise metrics analysis system and business method of the present invention includes a computer-supported tool for improved enterprise process analysis and change management. The new and improved system and method of the present invention is practiced in a system which collects data on the patterns of interaction among people in an organization, analyzes these relationships with respect to specific organizational processes and issues, and presents the results in a graphical format useful for business management decisions.

More particularly, by way of example and not necessarily by way of limitation, the enterprise metrics of the present invention includes a set of tools available to a consultant in the data analysis stage of the process, through the EnCompass® software. "EnCompass®" is a registered trademark of EnCompass Knowledge Systems, Inc., Los Angeles, Calif., the company which has pioneered innovative tools for analysis of interactive relationships and dynamics. Using a novel combination of statistical methods, enterprise metrics measure the amount of agreement among the organization's members with regard to the importance and impact of all their individual interactions with one another.

By way of example, the tools for analysis of interactive relationships and dynamics may include the following metrics:

1.) a metric for "CLARITY" which is determined by the criteria analysis:

$$\text{Clarity} = \frac{\text{Links(confirmed)}}{\text{Link(confirmed)} + \text{Links(unconfirmed)}}$$

the range of clarity is $0 \leq 1$, where 0 represents a total lack of clarity and 1 represents perfect agreement (within the preset agreement criteria);

2.) a metric for "INVOLVEMENT" which is determined by the criteria analysis:

$$\text{Involvement} = \frac{L}{N(2^{N-1} - 1)}$$

where:
L=confirmed links with Importance$\geq$3
N=total population ($[2^{N-1}-1]$ represents the maximum number of links in a population of size N)

the range of involvement is $0\leq 1$, where 0=no important interactions with others and 1=full involvement;

3.) a metric for "LEVERAGE" which is determined by the criteria analysis:

$$\text{Leverage} = \frac{L_1 + 2L_2 + 3L_3 + 4L_4 + 5L_5}{5N(2^{N-1} - 1)}$$

where:
$L^a$=number of confirmed links with Importance=a
N=total population ($[2^{N-1}-1]$ represents the maximum number of links in a population of size N)

the range of leverage is $0\leq 1$, where 0=no leverage and 1=maximum leverage;

4.) a metric for "PRIORITY" which is determined by the criteria analysis:

$$\text{Priority} = \frac{L_1 + 2L_2 + 3L_3 + 4L_4 + 5L_2}{10N(2^{N-1} - 1)}$$

where:

$L_a$=number of half-links with Impact=a

N=total population ($[2^{N-1}-1]$ represents the maximum number of links in a population of size N)

the range of priority values is $0 \leq 1$;

5.) a metric for "RELATIVE PRIORITY" which is determined by the criteria analysis:

$$\text{Relative Priority} = \frac{P_n}{\sum_i P_i}$$

where:

Pn=Priority value of issue n i=issue number; and

6.) a metric for "INTEGRATION" which is determined by the criteria analysis:

$$\text{Intergration} = \frac{L_1 + 2L_2 + 3L_3 + 4L_4 + 5L_5}{5N_1 N_2}$$

where:

$L_a$=number of confirmed links between unit 1 and unit 2 with Importance=a $N_1$, $N_2$=total number of links in unit 1 and unit 2 the range of integration is $0 \leq 1$, where 0=no connection between units and 1=full integration.

Taken singly, each of these metrics tools or indicators provides a means for quantifying an organizational characteristic such as "integration" or "clarity", which, in other analytical settings, is typically described in less precise and more impressionistic terms. Collectively, they amount to an overall "scorecard" of the degree to which an organization's communications and decision-making processes are integrated and effective. Once established, these figures can serve as benchmarks for orienting and monitoring organizational change and improvement, in accordance with the present invention.

Each of the individual enterprise metrics is based on a statistical equation that is automatically applied to a group of records, selected from an existing database according to criteria previously defined in the EnCompass® software. The context within which each of the results is displayed is likewise part of the EnCompass® system. The enterprise metrics, applied as the business method of the present invention, involves the statistical measurements themselves, as they are applied to the study of organizational dynamics, and the procedures by which the software selects appropriate database records and determines the resulting values for each of the metrics.

Enterprise metrics currently comprise six measurement groups, but may include others without departing from the scope of the invention. These groups may include the following:

1) CLARITY (or "alignment") is the overall level of agreement and understanding among the members of the organization or organizational unit;

2) INVOLVEMENT is a measure of how effectively the organization's members are engaged in carrying out the tasks that are viewed as important to it;

3) LEVERAGE is the degree to which the existence of an organization provides its members with greater influence than they would have a independent individuals;

4) PRIORITY is a measure of the perceived impact of all the issues examined in an EnCompass study;

5) RELATIVE PRIORITY is a measure of the perceived impact of a selected issue, as compared with that of the other issues under consideration; and 6) INTEGRATION measures the degree of interconnection between two organizations or organizational units, by examining the links between them.

The enterprise metrics evaluate links between nodes on a tree structure provided by the EnCompass® software. Therefore, the numbers they return depend on how many nodes are included in the calculation, and which ones. The program calculates the figures for every node (including the root) on the basis of a particular tree structure, whose depth and direction can be altered in two different ways. Noninteractively—that is, outside the user's control—the program can present metrics families which define various groups of nodes. Under the user's control within the user interface, the depth and direction of the tree display itself can limit the number of nodes to be included in the tree, and hence the calculation.

The most general use of the EnCompass® enterprise metrics is to examine the performance of an organization as a whole. For this, the analyst simply displays a tree with the highest-level entity as its root, and reads the figures attached to that node. However, metrics are in fact calculated and displayed for every node in the tree—that is, every person who is represented in a given analysis. When an analyst wishes to focus attention on a specific part of an organization, he or she can read the figures for any individual node.

It is possible to define families of metrics, which specify the group of nodes upon which the calculations will be based. Currently, there are two such families for all metrics. The immediate family includes only the node and its direct child nodes. The extended family includes a node and all those beneath it on the tree. Therefore, immediate metrics are based on a person's interactions with only those who report to him or her directly, whereas extended metrics produce figures reflecting his or her relationships with all subordinates at any level.

For the Clarity metric, there is an additional type; node clarity calculates the numbers of confirmed vs. unconfirmed links from the point of view a single node. In other words, the node's family includes only itself.

Other metrics families are also possible: for example, influence metrics count those persons anywhere in the organization who are within a person's sphere of influence, that is, those with whom the person has direct interaction links. Organization metrics measure any person's clarity, involvement, or other parameter with respect to the organization as a whole.

The user interface permits the analyst to limit the tree display to a desired number of levels. If the selected depth is less than that of the organization structure, the metrics calculations will change accordingly.

For any node, the direction of the tree also strongly affects the calculations for all nodes. It is possible to construct a tree upward though the data structure, so that the values for any individual node are calculated with respect to those above him or her in the organizational hierarchy, either direct superiors (in the case of the immediate metrics family) or all the way to the top of the organization structure (for extended metrics).

All of the above and other features of the invention are facilitated by appropriate software for providing/enabling the functions in the illustrated and equivalent embodiments to "make it happen" in achieving new and improved business analysis and management systems utilizing enterprise metrics.

The attached Exhibits A through H are provided in this application as explanatory of the preferred embodiments of the invention. These exhibits are:

Exhibit A—The EnCompass® Enterprise Metrics—64 pages;
Exhibit B—Parasol—Object-Oriented and Graphical Database Reference and Visualization—4 pages, double-sided;
Exhibit C—C+Objects—Volume One—Foundation Data Structures—8 pages double-sided;
Exhibit D—Parasol Developer User Guide—bound;
Exhibit E—C+O Class Library Foundation Data Structures—OS/2 Version/Volume One User's Guide—bound;
Exhibit F—C+O Class Library Foundation Data Structures—OS/2 Version/Volume One Reference Manual—bound;
Exhibit G—Transmittal Letter for Compact Disc containing EnCompass® Program—5 pages; and
Exhibit H—Two Compact Disc-Recordable (CD-R's) for EnCompass® Enterprise Metrics.

Of course, while the invention is described, by way of example, in the context of a business organization, the teachings of the invention may also be applicable to analysis of other systems and environments.

Examples of a preferred form of source code, for use in carrying out the above described software and firmware steps in conjunction with the hardware as described above in the practice of the present invention, are included in the CD-R as the official copy thereof which is a computer program listing appendix, and which is a part of this application and incorporated by reference herein.

It will be apparent from the foregoing that, while particular forms of the invention have been illustrated and described, various alternatives, modifications and variations can be made without departing from the spirit and scope of the invention. Accordingly, the invention is intended to embrace all such alternatives, modifications and variations and it is not intended that the invention be limited, except as by the appended claims.

What is claimed is:

1. A system for enhanced business analysis and management capable of predictive organizational performance comprising:
analysis and management software for defining the status of complex system/organization components in terms of issues and relationships, for obtaining input data from participants in an organization regarding their perception of the significance of their interaction with others on particular issues and/or relationships within the organization; and for quantifying the agreement among various system/organizational components relative to selected systems/organizational tool characteristics reflecting the interactive perspective of individuals relative to each other on said issues and relationships, to establish benchmarks for orienting and/or monitoring system/organization change and improvement for measuring, predicting and enhancing various aspects of the organization;
memory, for storing the analysis and management software; and
a processor, for processing the analysis and management software;
wherein said tool characteristic includes a metric, said metric comprises a "CLARITY", said "CLARITY" equals:

$$Clarity = \frac{Links(confirmed)}{Link(confirmed) + Links(unconfirmed)}$$

wherein the range of clarity is $0 \leq 1$, where 0 represents a total lack of clarity and 1 represents perfect agreement.

2. A system for enhanced business analysis and management capable of predictive organizational performance comprising:
analysis and management software for defining the status of complex system/organization components in terms of issues and relationships, for obtaining input data from participants in an organization regarding their perception of the significance of their interaction with others on particular issues and/or relationships within the organization; and for quantifying agreement among various system/organizational components relative to selected systems/organizational tool characteristics reflecting the interactive perspective of individuals relative to each other on said issues and relationships, to establish benchmarks for orienting and/or monitoring system/organization change and improvement for measuring, predicting and enhancing various aspects of the organization;
memory, for storing the analysis and management software; and
a processor, for processing the analysis and management software;
wherein said tool characteristic includes a metric, said metric comprises an "INVOLVEMENT", said "INVOLVEMENT" equals:

$$Involvement = \frac{L}{N(2^{N-1} - 1)}$$

where: L=confirmed links with Importance$\geq 3$
N=total population ($[2^{N-1}-1]$ represents the maximum number of links in a population of size N)
wherein the range of involvement is $0 \leq 1$, where 0=no important interactions with others and 1=full involvement.

3. A system for enhanced business analysis and management capable of predictive organizational performance comprising:
analysis and management software for defining the status of complex system/organization components in terms of issues and relationships, for obtaining input data from participants in an organization regarding their perception of the significance of their interaction with others on particular issues and/or relationships within the organization; and for quantifying the agreement among various system/organizational components relative to selected systems/organizational tool characteristics reflecting the interactive perspective of individuals relative to each other on said issues and relationships, to establish benchmarks for orienting and/or monitoring system/organization change and improvement for measuring predicting and enhancing various aspects of the organization;

memory, for storing the analysis and management software; and a processor, for processing the analysis and management software;

wherein said tool characteristic includes a metric, said metric comprises a "LEVERAGE", said "LEVERAGE" equals:

$$\text{Leverage} = \frac{L_1 + 2L_2 + 3L_3 + 4L_4 + 5L_5}{5N(2^{N-1} - 1)}$$

where: $L^o$=number of confirmed links with Importance=a

N=total population ($[2^{N-1}-1]$ represents the maximum number of links in a population of size N)

wherein the range of leverage is $0 \leq 1$, where 0=no leverage and 1=maximum leverage.

4. A system for enhanced business analysis and management capable of predictive organizational performance comprising:

analysis and management software for defining the status of complex system/organization components in terms of issues and relationships, for obtaining input data from participants in an organization regarding their perception of the significance of their interaction with others on particular issues and/or relationships within the organization; and for quantifying the agreement among various system/organizational components relative to selected systems/organizational tool characteristics reflecting the interactive perspective of individuals relative to each other on said issues and relationships, to establish benchmarks for orienting and/or monitoring system/organization change and improvement for measuring, predicting and enhancing various aspects of the organization;

memory, for storing the analysis and management software; and a processor, for processing the analysis and management software;

wherein said tool characteristic includes a metric, said metric comprises a "PRIORITY", said "PRIORITY" equals:

$$\text{Priority} = \frac{L_1 + 2L_2 + 3L_3 + 4L_4 + 5L_5}{10N(2^{N-1} - 1)}$$

where: $L_a$=number of half-links with Impact=a

N=total population ($[2^{N-1}-1]$ represents the maximum number of links in a population of size N)

wherein the range of priority values is $0 \leq 1$.

5. A system for enhanced business analysis and management capable of predictive organizational performance comprising:

analysis and management software for defining the status of complex system/organization components in terms of issues and relationships, for obtaining input data from participants in an organization regarding their perception of the significance of their interaction with others on particular issues and/or relationships within the organization; and for quantifying the agreement among various system/organizational components relative to selected systems/organizational tool characteristics reflecting the interactive perspective of individuals relative to each other on said issues and relationships, to establish benchmarks for orienting and/or monitoring system/organization change and improvement for measuring, predicting and enhancing various aspects of the organization;

memory, for storing the analysis and management software; and a processor, for processing the analysis and management software;

wherein said tool characteristic includes a metric, said metric comprises a "RELATIVE PRIORITY", said "RELATIVE PRIORITY" equals:

$$\text{Relative Priority} = \frac{P_a}{\sum_i P_i}$$

where: Pn=Priority value of issue n i=issue number.

6. A system for enhanced business analysis and management capable of predictive organizational performance comprising:

analysis and management software for defining the status of complex system/organization components in terms of issues and relationships, for obtaining input data from participants in an organization regarding their perception of the significance of their interaction with others on particular issues and/or relationships within the organization; and for quantifying the agreement among various system/organizational components relative to selected systems/organizational tool characteristics reflecting the interactive perspective of individuals relative to each other on said issues and relationships, to establish benchmarks for orienting and/or monitoring system/organization change and improvement for measuring, predicting and enhancing various aspects of the organization;

memory, for storing the analysis and management software; and a processor, for processing the analysis and management software, wherein said tool characteristic includes a metric, said metric comprises an "INTEGRATION", said "INTEGRATION" equals:

$$\text{Integration} = \frac{L_1 + 2L_2 + 3L_3 + 4L_4 + 5L_5}{5N_1N_2}$$

where: $L_a$=number of confirmed links between unit 1 and unit 2 with Importance=a N1, N2=total number of links in unit 1 and unit 2 wherein the range of integration is $0 \leq 1$, where 0=no connection between units and 1=full integration.

7. A method of enhancing business analysis and management capable of predictive organizational performance in a system which comprises analysis and management software, for defining the status of complex system/organization components in terms of issues and relationships, for obtaining input data from participants in an organization regarding their perception of the significance of their interaction with others on particular issues and/or relationships within the organization; and for quantifying the agreement among various system/organizational components relative to selected systems/organizational tool characteristics reflecting the interactive perspective of individuals relative to each other on said issues and relationships, to establish benchmarks for orienting and/or monitoring system/organization change and improvement for measuring, predicting and enhancing various aspects of the organization; wherein the method comprises:

storing the analysis and management software in the memory; and processing the analysis and management software in a processor, which includes:

obtaining input data from participants in an organization regarding their perception of the significance of their interaction with others on particular issues and/or relationships within the organization;

defining the status of complex system/organization components in terms of issues and relationships; and quantifying the agreement among said various system/organizational components relative to selected systems/organizational tool characteristics reflecting the interactive perspective of individuals relative to each other on said issues and relationships, to establish benchmarks for orienting and/or monitoring system/organization change and improvement for measuring, predicting and enhancing various aspects of the organization;

wherein said tool characteristic includes a metric, said metric comprises a "CLARITY", said "CLARITY" equals:

$$\text{Clarity} = \frac{\text{Links(confirmed)}}{\text{Link(confirmed)} + \text{Links(unconfirmed)}}$$

wherein the range of clarity is $0 \leq 1$, where 0 represents a total lack of clarity and 1 represents perfect agreement.

8. A method of enhancing business analysis and management capable of predictive organizational performance in a system which comprises analysis and management software, for defining the status of complex system/organization components in terms of issues and relationships, for obtaining input data from participants in an organization regarding their perception of the significance of their interaction with others on particular issues and/or relationships within the organization; and for quantifying the agreement among various system/organizational components relative to selected systems/organizational tool characteristics reflecting the interactive perspective of individuals relative to each other on said issues and relationships, to establish benchmarks for orienting and/or monitoring system/organization change and improvement for measuring, predicting and enhancing various aspects of the organization; wherein the method comprises:

storing the analysis and management software in the memory; and processing the analysis and management software in a processor, which includes:

obtaining input data from participants in an organization regarding their perception of the significance of their interaction with others on particular issues and/or relationships within the organization;

defining the status of complex system/organization components in terms of issues and relationships; and quantifying the agreement among said various system/organizational components relative to selected systems/organizational tool characteristics reflecting the interactive perspective of individuals relative to each other on said issues and relationships, to establish benchmarks for orienting and/or monitoring system/organization change and improvement for measuring, predicting and enhancing various aspects of the organization;

wherein said tool characteristic includes a metric, said metric comprises an "INVOLVEMENT", said "INVOLVEMENT" equals:

$$\text{Involvement} = \frac{L}{N(2^{N-1} - 1)}$$

where: L=confirmed links with Importance$\geq 3$

N=total population ($[2^{N-1}-1]$ represents the maximum number of links in a population of size N)

wherein the range of involvement is $0 \leq 1$, where 0=no important interactions with others and 1=full involvement.

9. A method of enhancing business analysis and management capable of predictive organizational performance in a system which comprises analysis and management software, for defining the status of complex system/organization components in terms of issues and relationships, for obtaining input data from participants in an organization regarding their perception of the significance of their interaction with others on particular issues and/or relationships within the organization; and for quantifying the agreement among various system/organizational components relative to selected systems/organizational tool characteristics reflecting the interactive perspective of individuals relative to each other on said issues and relationships, to establish benchmarks for orienting and/or monitoring system/organization change and improvement for measuring, predicting and enhancing various aspects of the organization; wherein the method comprises:

storing the analysis and management software in the memory; and processing the analysis and management software in a processor, which includes:

obtaining input data from participants in an organization regarding their perception of the significance of their interaction with others on particular issues and/or relationships within the organization;

defining the status of complex system/organization components in terms of issues and relationships; and quantifying the agreement among said various system/organizational components relative to selected systems/organizational tool characteristics reflecting the interactive perspective of individuals relative to each other on said issues and relationships, to establish benchmarks for orienting and/or monitoring system/organization change and improvement for measuring, predicting and enhancing various aspects of the organization;

wherein said tool characteristic includes a metric, said metric comprises a "LEVERAGE", said "LEVERAGE" equals:

$$\text{Leverage} = \frac{L_1 + 2L_2 + 3L_3 + 4L_4 + 5L_5}{5N(2^{N-1} - 1)}$$

where: $L^\circ$=number of confirmed links with Importance=a

N=total population ($[2^{N-1}-1]$ represents the maximum number of links in a population of size N)

wherein the range of leverage is $0 \leq 1$, where 0=no leverage and 1=maximum leverage.

10. A method of enhancing business analysis and management capable of predictive organizational performance in a system which comprises analysis and management software, for defining the status of complex system/organization components in terms of issues and relationships, for obtaining input data from participants in an organization regarding their perception of the significance of their interaction with others on particular issues and/or relationships within the organization; and for quantifying the agreement among various system/organizational components relative to selected systems/organizational tool characteristics reflecting the interactive perspective of individuals relative to each other on said issues and relationships, to establish benchmarks for orienting and/or monitoring system/organization change and improvement for measuring, predicting and enhancing various aspects of the organization; wherein the method comprises:

storing the analysis and management software in the memory; and processing the analysis and management software in a processor, which includes:
  obtaining input data from participants in an organization regarding their perception of the significance of their interaction with others on particular issues and/or relationships within the organization;
  defining the status of complex system/organization components in terms of issues and relationships; and
  quantifying the agreement among said various system/organizational components relative to selected systems/organizational tool characteristics reflecting the interactive perspective of individuals relative to each other on said issues and relationships,
  to establish benchmarks for orienting and/or monitoring system/organization change and improvement for measuring, predicting and enhancing various aspects of the organization;
  wherein said tool characteristic includes a metric, said metric comprises a "PRIORITY", said "PRIORITY" equals:

$$\text{Priority} = \frac{L_1 + 2L_2 + 3L_3 + 4L_4 + 5L_5}{10N(2^{N-1} - 1)}$$

where: $L_a$=number of half-links with Impact=a
  N=total population ($[2^{N-1}-1]$ represents the maximum number of links in a population of size N)
  wherein the range of priority values is $0 \leq 1$.

11. A method of enhancing business analysis and management capable of predictive organizational performance in a system which comprises analysis and management software, for defining the status of complex system/organization components in terms of issues and relationships, for obtaining input data from participants in an organization regarding their perception of the significance of their interaction with others on particular issues and/or relationships within the organization; and for quantifying the agreement among various system/organizational components relative to selected systems/organizational tool characteristics reflecting the interactive perspective of individuals relative to each other on said issues and relationships, to establish benchmarks for orienting and/or monitoring system/organization change and improvement for measuring, predicting and enhancing various aspects of the organization; wherein the method comprises:

storing the analysis and management software in the memory; and processing the analysis and management software in a processor, which includes:
  obtaining input data from participants in an organization regarding their perception of the significance of their interaction with others on particular issues and/or relationships within the organization;
  defining the status of complex system/organization components in terms of issues and relationships; and
  quantifying the agreement among said various system/organizational components relative to selected systems/organizational tool characteristics reflecting the interactive perspective of individuals relative to each other on said issues and relationships,
  to establish benchmarks for orienting and/or monitoring system/organization change and improvement for measuring, predicting and enhancing various aspects of the organization;
  wherein said tool characteristic includes a metric, said metric comprises a "RELATIVE PRIORITY", said "RELATIVE PRIORITY" equals:

$$\text{Relative Priority} = \frac{P_n}{\sum_i P_i}$$

where: Pn=Priority value of issue n
  i=issue number.

12. A method of enhancing business analysis and management capable of predictive organizational performance in a system which comprises analysis and management software, for defining the status of complex system/organization components in terms of issues and relationships, for obtaining input data from participants in an organization regarding their perception of the significance of their interaction with others on particular issues and/or relationships within the organization; and for quantifying the agreement among various system/organizational components relative to selected systems/organizational tool characteristics reflecting the interactive perspective of individuals relative to each other on said issues and relationships, to establish benchmarks for orienting and/or monitoring system/organization change and improvement for measuring, predicting and enhancing various aspects of the organization; wherein the method comprises:

storing the analysis and management software in the memory; and processing the analysis and management software in a processor, which includes:
  obtaining input data from participants in an organization regarding their perception of the significance of their interaction with others on particular issues and/or relationships within the organization;
  defining the status of complex system/organization components in terms of issues and relationships; and
  quantifying the agreement among said various system/organizational components relative to selected systems/organizational tool characteristics reflecting the interactive perspective of individuals relative to each other on said issues and relationships,
  to establish benchmarks for orienting and/or monitoring system/organization change and improvement for measuring, predicting and enhancing various aspects of the organization;
  wherein said tool characteristic includes a metric, said metric comprises an "INTEGRATION", said "INTEGRATION" equals:

$$\text{Intergration} = \frac{L_1 + 2L_2 + 3L_3 + 4L_4 + 5L_5}{5N_1 N_2}$$

where: $L_a$=number of confirmed links between unit 1 and unit 2 with Importance=a
  N1, N2=total number of links in unit 1 and unit 2
  wherein the range of integration is $0 \leq 1$, where 0=no connection between units and 1=full integration.

* * * * *